Dec. 5, 1950            J. H. GIESEN            2,532,296

BONE SCREW AND METHOD OF FASTENING

Filed Nov. 9, 1948

INVENTOR.
JOSEPH H. GIESEN
BY
*D. E. Snyder*
Atty.

Patented Dec. 5, 1950

2,532,296

UNITED STATES PATENT OFFICE 2,532,296

BONE SCREW AND METHOD OF FASTENING

Joseph H. Giesen, Waterville, Maine

Application November 9, 1948, Serial No. 59,179

4 Claims. (Cl. 128—92)

This invention relates to bone-pinning techniques for healing broken bones, and to a screw especially suitable to such purposes.

The present invention is a continuation-in-part of my copending application, Serial No. 683,377, filed July 13, 1946, now abandoned, wherein there is disclosed a bone screw having a drill point merging into a tap which in turn merges into a threaded portion, the latter being fluted longitudinally to afford channels for carrying away bone chips. It is the primary object of the present invention to devise a similar screw in which the straight flutes extend directly out through the screw head with their bottoms forming parallel lines equidistantly spaced from the axis of the screw.

As a result of this improved formation, the screw head may be kerfless as it does not require a conventional screw driver to set it. Instead, a chuck having jaws slidably but non-rotatably associated with the flutes may be used, so that the screw may be gripped anywhere between the drill point and the screw head to facilitate drilling and threading, and then the head itself may be held by the jaws for final tightening. This sliding coaction also permits substantially automatic withdrawal of the screw from the chuck as the threads follow the drill point into the bone; and it also permits more than one screw to be carried in the drill so as to be fed outwardly one at a time.

It is another important object of this invention to devise an improved bone-pinning method whereby, in one operation involving drilling, tapping and threading with a special screw, threads of two different sizes are securely set into the opposite walls of a hollow bone structure.

The foregoing and further objects of the invention should clearly appear from a study of the following description when taken in conjunction with the accompanying drawing, wherein.

Figure 2:
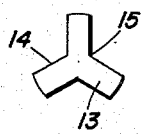
Fig. 2 is a top plan view of the screw of Fig. 1.
Figure 1:
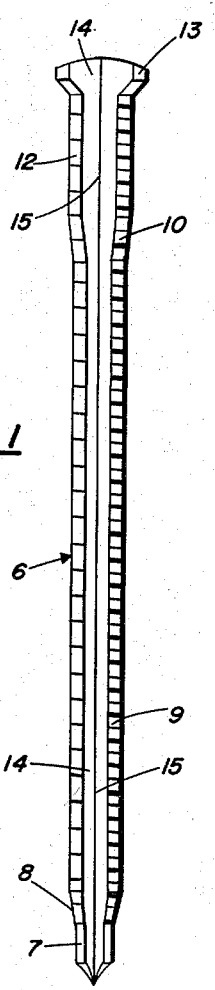
Fig. 1 is an elevational view of a preferred embodiment.

With continued reference to the drawing, the illustrated screw, indicated in entirety by numeral 6, comprises a drill point 7 merging into a short tap portion 8, followed by an elongated threaded shank 9; and a second tap portion 10 merging into a shorter and enlarged threaded section 12 having the same pitch threads as the threaded shank 9, and which carries an integral head 13.

The screw is fluted longitudinally from end to end by three relatively wide V-shaped grooves 14, equally spaced, the bottoms of which are indicated by lines 15. These lines are parallel to the screw axis throughout their lengths, so that the screw may be inserted and slidably withdrawn from the jaws of a Jacobs chuck or other mechanical device, even to the point of withdrawal of the head 13 so that another screw may follow into position from within the actuating device. However, the grooves may be slightly deeper within the drill point if desired, as the jaws do not necessarily extend that far.

The chief advantage of the grooves is that only a small portion of the screw may be disposed between the chuck jaws and the bone as the work proceeds, thus facilitating close and accurate work and contributing to the stability of the screw during its progress. When the threaded portions of the screw have completely entered the bone the chuck jaws are in position at the head 13 to finally tighten the screw, and for this reason the head preferably has substantial thickness instead of being provided with the usual kerf. Hence, there is no need for a conventional screw driver to finish the job.

The flutes 14 further serve as channels for carrying away bone chips; and their sharp longitudinal edges serve to impart a cutting or tapping action to the screw sections 8 and 10.

Figure 4:
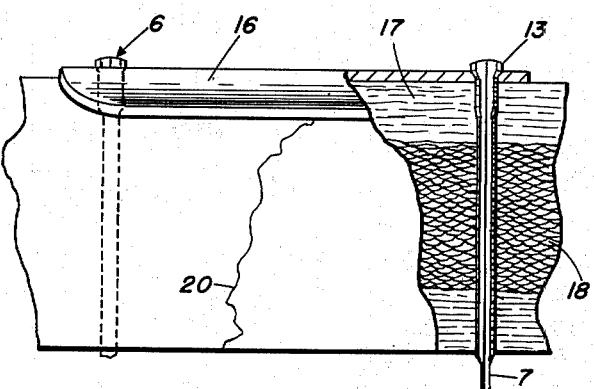
Fig. 4 represents a fractured segment of a bone having a holding and reenforcing plate secured thereto by screws such as seen in Figs. 1–3.
Figure 3:
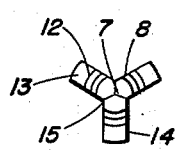
Fig. 3 is a bottom plan view of the same screw.

In securing a plate 16 to a bone 17 having marrow 18 and a fracture 20 it is only necessary to place the plate in position (after cutting and moving aside any interfering flesh), and then in a single operation to cause the screw to drill, tap and thread itself into the position seen in Fig. 4. The threads formed in the first cortex of the bone by the tap 8 are for the most part removed by the second tap 10 to obtain a very tight fitting for the threads 12. If the second tap and its enlarged threads were not provided, the threads in the first cortex would become stripped due to failure of the drill point to penetrate the second cortex at a rate as fast as the forward movement of the shank 9 within said threads of the first cortex.

The screws are made in several lengths, and each is selected for the job so that its drill point extends beyond the second cortex to be cut off after the screw is set, as illustrated in Fig. 4.

The length of the shank 9 preferably is such that it approximately equals the diameter of the bone marrow plus the thickness of one cortex.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A bone screw comprising a drilling point merging into a tapered tap portion; an elongated, threaded holding portion of uniform diameter integral with said tap portion and merging into a second and enlarged tap portion; a second threaded holding portion of uniform diameter extending from said enlarged tap portion; and a substantially flat and relatively thin head integral with said second holding portion.

2. A self tapping bone fastening screw, comprising an elongated body having a sharp pointed end forming a rotary cutting drill; a first outwardly tapered thread cutting section adjoining said drill; a first threaded section of uniform diameter adjoining the larger end of said thread cutting section; a second outwardly tapered thread cutting section following said first threaded section; a second threaded section of substantially uniform diameter adjoining the larger end of said second thread cutting section and larger in diameter than said first threaded section, the threads of both said thread cutting and both said threaded sections having the same pitch; a head adjoining and larger than the other end of said second threaded section; and radial recesses forming flutes extending longitudinally of the screw from end to end.

3. A self tapping bone fastening screw, comprising an elongated body having a sharp pointed end forming a rotary cutting drill; a first outwardly tapered thread cutting section adjoining said drill; a first threaded section of uniform diameter adjoining the larger end of said thread cutting section; a second outwardly tapered thread cutting section adjoining the other end of said first threaded section; a second threaded section of substantially uniform diameter adjoining the larger end of said second thread cutting section and larger in diameter than said first threaded section, the threads of both said thread cutting and both said threaded sections having the same pitch; a head adjoining and larger than the other end of said second threaded section; and means forming tool receiving means along the whole length of the screw, comprising a plurality of equiangularly spaced peripheral grooves of equal size extending parallel to the axis of the screw, with the roots of the grooves all equidistant and parallel to the axis of the screw, said grooves extending from the pointed end of the drill continuously to the other end and through said head.

4. A bone pinning method comprising the steps of sequentially drilling through diametrically opposed bone cortexes; simultaneously tapping threads of the same pitch but of different diameters in the drilled holes; and threading a screw having different diameters into both threaded cortexes simultaneously.

JOSEPH H. GIESEN.

REFERENCES CITED

The following references are of record in the file of this patent:

UNITED STATES PATENTS

| Number | Name | Date |
|---|---|---|
| 141,908 | Ackerman | Aug. 19, 1873 |
| 1,000,280 | Messenger | Aug. 8, 1911 |
| 1,210,508 | Marye | Jan. 2, 1917 |
| 1,475,561 | Bath | Nov. 27, 1923 |
| 1,508,594 | Brubaker | Sept. 16, 1924 |
| 2,382,019 | Miller | Aug. 14, 1945 |
| 2,388,482 | Haynes | Nov. 6, 1945 |
| 2,424,113 | Norberg | July 15, 1947 |